United States Patent
Mashburn

(10) Patent No.: US 9,259,861 B2
(45) Date of Patent: *Feb. 16, 2016

(54) METHOD OF RECYCLING SYNTHETIC TURF

(71) Applicant: Textile Management Associates, Inc., Dalton, GA (US)

(72) Inventor: Larry Mashburn, Ringgold, GA (US)

(73) Assignee: Textile Management Associates, Inc., Dalton, GA (US)

( * ) Notice: Subject to any disclaimer, the term of this patent is extended or adjusted under 35 U.S.C. 154(b) by 393 days.

This patent is subject to a terminal disclaimer.

(21) Appl. No.: 13/672,227

(22) Filed: Nov. 8, 2012

(65) Prior Publication Data

US 2013/0064996 A1    Mar. 14, 2013

Related U.S. Application Data

(63) Continuation-in-part of application No. 12/638,656, filed on Dec. 15, 2009.

(60) Provisional application No. 61/557,073, filed on Nov. 8, 2011, provisional application No. 61/122,592, filed on Dec. 15, 2008.

(51) Int. Cl.

| | |
|---|---|
| *B29C 67/02* | (2006.01) |
| *B29C 73/00* | (2006.01) |
| *B29B 17/02* | (2006.01) |
| *B29B 17/04* | (2006.01) |
| *C08J 11/06* | (2006.01) |
| *E01C 13/08* | (2006.01) |
| *B29K 67/00* | (2006.01) |
| *B29K 75/00* | (2006.01) |
| *B29L 31/00* | (2006.01) |

(52) U.S. Cl.
CPC ............. *B29B 17/0206* (2013.01); *C08J 11/06* (2013.01); *B29K 2023/06* (2013.01); *B29K 2067/00* (2013.01); *B29K 2075/00* (2013.01); *B29L 2031/732* (2013.01); *Y10T 428/13* (2015.01)

(58) Field of Classification Search
None
See application file for complete search history.

(56) References Cited

U.S. PATENT DOCUMENTS

| | | | |
|---|---|---|---|
| 5,185,380 A | 2/1993 | Diessel et al. | |
| 5,312,573 A | 5/1994 | Rosenbaum et al. | |
| 5,595,696 A * | 1/1997 | Schlarb et al. | 264/118 |
| 5,859,071 A * | 1/1999 | Young et al. | 521/40.5 |
| 6,428,298 B1 * | 8/2002 | Clauss et al. | 425/71 |
| 6,797,216 B2 | 9/2004 | Furgiuele et al. | |
| 6,814,826 B1 * | 11/2004 | Bell | 156/94 |
| 6,838,030 B2 * | 1/2005 | Hashimoto et al. | 264/144 |
| 8,110,131 B1 * | 2/2012 | Dell'Orco et al. | 264/141 |
| 2001/0008322 A1 | 7/2001 | Rosenbaum | |

(Continued)

FOREIGN PATENT DOCUMENTS

| | | | |
|---|---|---|---|
| EP | 2186942 | * | 5/2010 |
| JP | 2000008314 | | 1/2000 |

(Continued)

*Primary Examiner* — Jeffrey Wollschlager

(74) *Attorney, Agent, or Firm* — Robinson IP Law, PLLC

(57) ABSTRACT

Disclosed herein is a method for recycling synthetic turf that includes combining a plurality of synthetic turf fragments with additives to form a mixture and extruding the mixture. The method produces a recycled material suitable for use as infill in a synthetic turf. Accordingly, an infill for synthetic turf and a synthetic turf including that infill are disclosed herein.

21 Claims, 2 Drawing Sheets

(56) References Cited

U.S. PATENT DOCUMENTS

| | | |
|---|---|---|
| 2001/0009710 A1 | 7/2001 | Zegler et al. |
| 2001/0033902 A1 | 10/2001 | Seaton |
| 2001/0048177 A1 | 12/2001 | Close et al. |
| 2002/0031653 A1 | 3/2002 | Ricciardelli et al. |
| 2002/0039636 A1 | 4/2002 | Fink et al. |
| 2005/0206029 A1* | 9/2005 | Moore et al. ............ 264/143 |
| 2007/0043128 A1* | 2/2007 | Jenkines et al. ............ 521/40 |
| 2008/0128933 A1* | 6/2008 | Przybylinski et al. ......... 264/31 |
| 2010/0247814 A1* | 9/2010 | Nisikawa et al. ............ 428/17 |

FOREIGN PATENT DOCUMENTS

| | | | |
|---|---|---|---|
| JP | 4219962 | * | 2/2009 |
| WO | WO2009/078128 | * | 6/2009 |

* cited by examiner

METHOD OF RECYCLING SYNTHETIC TURF

CROSS-REFERENCE TO RELATED APPLICATION(S)

This application claims priority to U.S. Provisional Application No. 61/557,073 entitled "Method of Recycling Synthetic Turf," filed Nov. 8, 2011, as well as pending U.S. Nonprovisional application Ser. No. 12/638,656 entitled "Method of Recycling Synthetic Turf and Infill Product," filed on Dec. 15, 2009, which claims priority to U.S. Provisional Application No. 61/122,592 entitled "Method of Recycling Synthetic Turf and Infill Product," filed on Dec. 15, 2008, the entireties of which are incorporated herein by reference.

FIELD

This application is related to the field of synthetic turf, and more particularly to methods of recycling synthetic turf and related infill materials.

BACKGROUND

Synthetic turf has been used for years in athletic playing surfaces such as football, baseball, and soccer fields, and has more recently been used in other applications where an alternative to natural grass is desired. These applications include, for example, playgrounds, residential and commercial lawns, landscaping, jogging paths, paintball fields, tennis courts, putting greens, and dog runs. Typically, synthetic turf includes a pile fabric having a backing and a plurality of upstanding ribbons, also called face fibers or filiform formations, resembling natural grass. Many synthetic turf products also include an infill material dispersed among the upstanding ribbons, which may include sand, tire rubber crumb, and/or other particulates, either singularly or in combination with each other. The infill material simulates soil in natural turf, acts as a ballast, and/or contributes to the physical properties of the turf, such as resiliency, that make the turf suitable for a particular use.

Synthetic turf has a limited useful life, the length of which depends on the construction of the turf, the application for which it is used, and how the turf is maintained. As an example, a typical synthetic turf for use as an athletic field may have a useful life of from about 8 to 15 years. A large amount of synthetic turf is currently being used in hundreds of athletic fields and in other applications. To avoid sending that turf to landfills at the end of its useful life, there is a need for a method of recycling and reusing all or portions of the synthetic turf. There is also a need for a synthetic turf that is recyclable.

Recycling of a product typically refers to converting that product into a material or product for another use or extracting at least one of the individual components or materials of the product for use of that component or material in another product. The recycled product may be used in a similar product, such as when paper products are recycled to make other paper products, or may be used in a completely different product, such as when tires are recycled to make asphalt.

Methods for recycling carpet and for preparing carpet backing using recycled carpet scrap are known. Some such methods involve separating the carpet yarns, or tufts, from the backing, for example by cutting, and processing only the tufts to recover any nylon. In another recycling process the tufts can be spun into a new yarn for use in carpet or other textiles.

One problem with these methods is that only the face fibers are recycled and the backing must be otherwise disposed of. Other methods of recycling carpets include grinding carpet scrap, including the backing, into a fine powder. The powder is then introduced into a carpet backing formulation which may be used as, for example, a precoat, laminate coating, skip coating, or foam coating. The formulation is then applied to a substrate, and cured by heating or drying. One problem with these processes for recycling carpet is that recycled material can make up only about 5% by weight of the carpet backing into which the recycled material is incorporated. This corresponds to approximately 2.5% by weight of a broadloom carpet.

Synthetic turf differs in composition from carpet, and those differences in composition make conventional carpet recycling processes unsuitable for recycling synthetic turf. The majority of carpet products use nylon face fibers, while the majority of current synthetic turf products use polyethylene. The primary coating of most broadloom carpet is a latex coating, while the primary coating in most synthetic turf is polyurethane. In the United States, only a small fraction of broadloom carpet includes a coating containing polyurethane, and only a small fraction of synthetic turfs have a coating containing latex.

Most of the synthetic turf manufactured in recent years has had a polyurethane coating applied to the backing. There is a belief that polyurethane coated synthetic turf as a whole cannot be recycled. This is because the polyurethane coating, according to conventional wisdom, cannot be recycled. Polyurethane is thermoset (versus thermoplastic) and is therefore difficult and costly to recycle. Polyurethane is the reaction product of a polyol and an isocyanate. When these chemicals are mixed together and cured they form a solid polyurethane. The combination is applied to the backing of a tufted material for the purpose of locking the face fibers into the primary backing. An additional coating of a hot melt adhesive or a polyurethane foam can also be applied. This secondary coating is typically used to attach a secondary backing which can be polyester or polypropylene.

Many synthetic turf products include components that are not found in carpet and that are incompatible with, or at least undesirable in, conventional carpet recycling methods. For example, conventional carpet does not include infill. Typical infill materials for synthetic turf installations include sand, tire rubber crumb, and/or other particulates, either singularly or in combination with each other. Thus, recycling synthetic turf presents a unique problem not encountered in the recycling of carpet. Separating infill from the remainder of the turf may require use of special equipment, and there may be environmental concerns associated with disposing of the separated infill. Additional concerns in the recycling process are the effect of any residual infill particulates on the size reduction process and on the properties of the final product.

Conventional carpet recycling methods provide end products that are inconsistent with or that are not ideal uses of recycled synthetic turf. For example, nylon carpet recycling is focused primarily on separating and recovering the nylon, which is of greater value than other carpet components. In contrast, current synthetic turf typically contains little or no nylon. Additionally, conventional carpet recycling methods produce, as described above, a dry powder that can be incorporated in small amounts into carpet backings. Alternatively, for synthetic turf recycling, it is desirable to recover and reuse most or all of the synthetic turf, and to do so in a way that the recycled synthetic turf makes up a large percentage of the turf into which it is incorporated.

There remains a need for an improved method of recycling and reusing an existing synthetic turf, or at least a portion of an existing synthetic turf, to avoid sending the entire synthetic turf to a landfill when it is no longer useful. There is also a need for a synthetic turf that can be recycled and reused.

SUMMARY

A method of recycling synthetic turf into a product that can be used in a variety of applications including as synthetic turf infill is disclosed. The method includes the steps of (a) combining a plurality of synthetic turf fragments with at least one modifier, filler, or colorant to form a mixture; (b) extruding the mixture to form an extrudate; and (c) cutting the extrudate into pieces.

In one embodiment, the modifier is selected from the group consisting of polypropylene, polyethylene, rubber, Exxon Vistamaxx 3000, Exxon PX9361, Exxon PX 9371, Faraprene 381-35A, and combinations thereof. In another embodiment, the filler is selected from the group consisting of calcium carbonate, barium sulfate, coal fly ash, iron oxide, and combinations thereof.

In one embodiment, the step of combining the synthetic turf fragments with at least one modifier, filler, or colorant occurs in the extruder. In another embodiment, the step of combining the synthetic turf fragments with at least one modifier, filler, or colorant includes conveying the synthetic turf fragments to a blender, conveying the at least one modifier, filler, or colorant to the blender, and mixing the fragments and the at least one modifier, filler, or colorant in the blender. In yet another embodiment, the steps of conveying the synthetic turf fragments to the blender and conveying the at least one modifier, filler, or colorant to the blender occur concurrently. In one embodiment, the steps of conveying the synthetic turf fragments; conveying the modifier, filler, or colorant; and mixing are continuous.

In one embodiment, the method further includes passing the extrudate through chilled rollers prior to cutting the extrudate into pieces. In another embodiment, the step of passing the extrudate through chilled rollers includes pressing and densifying the extrudate. In yet another embodiment, the method further includes passing the extrudate through a chilled water bath prior to cutting the extrudate into pieces.

In one embodiment, the step of extruding the mixture includes forcing the mixture through a slot.

In another embodiment, the step of extruding the mixture is continuous.

In one embodiment, the step of cutting the extrudate into pieces includes cutting the extrudate into strands and cutting the strands into pellets.

In another embodiment, the method further includes removing infill from the synthetic turf fragments before combining them with the modifier, filler, or colorant.

In one embodiment, the synthetic turf includes face fibers, a primary backing, and a primary coating. In another embodiment, the face fibers comprise polyethylene, polypropylene, nylon, or a combination thereof. In yet another embodiment, the primary backing comprises polyester or polypropylene or combinations thereof. In one embodiment, the primary coating comprises polyurethane, latex, hot melt, or a thermoplastic or combination thereof.

In one embodiment, the polyethylene, polypropylene or nylon or the combination thereof comprise about 19 wt % to about 80 wt % of the synthetic turf fragments. In another embodiment, the polyester or polypropylene or the combination thereof comprise about 1 wt % to about 25 wt % of the synthetic turf fragments. In yet another embodiment, the polyurethane, latex, hot melt, or the thermoplastic, or the combination thereof comprise about 15 wt % to about 80 wt % of the synthetic turf fragments.

In one embodiment, pellets are formed using the method described above. In another embodiment, an infill is formed from the method described above. In yet another embodiment, the infill further includes a filler, sand, or rubber, or a combination thereof.

In one embodiment, a synthetic turf is formed using the method described above. In another embodiment, an object is formed using the method described above including the pellets, wherein the object is an athletic field, tennis court, landscaping, putting green, a backing, track, playground material, baseboard, fiber, or a container.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

Figure 1:
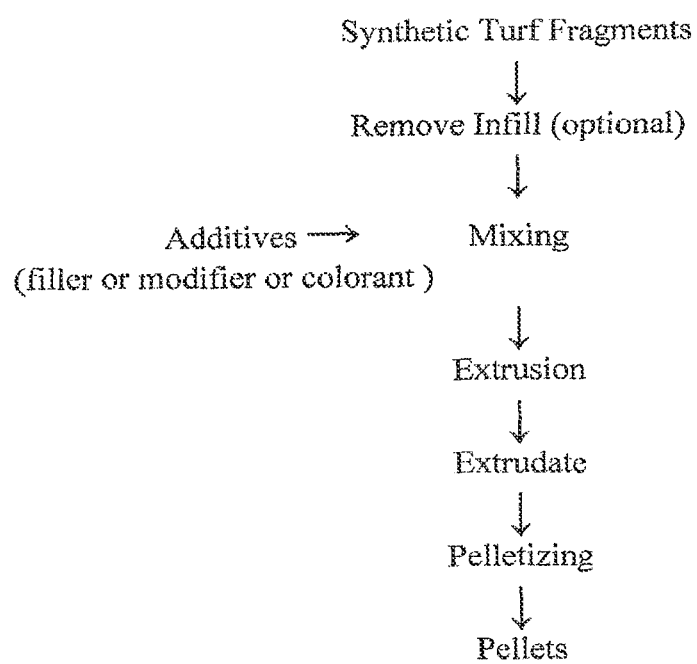
FIG. 1 is a flow chart of a process for recycling synthetic turf.

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

Embodiments of this invention provide methods of recycling and reusing an existing synthetic turf or a portion of an existing synthetic turf. Other embodiments of this invention provide infill for a synthetic turf wherein the infill is recyclable and can be incorporated into a synthetic turf such that the synthetic turf may be recycled and reused.

Synthetic Turf

Typically, the synthetic turf to be recycled with the present method includes a pile fabric having a backing and a plurality of upstanding ribbons, also called face fibers or filiform formations, resembling grass. Typically, the upstanding ribbons are made of polyethylene, polypropylene or a blend thereof. The ribbons may also be made of nylon or any other material known in the art alone or in combination with polypropylene and/or polyethylene. These face fibers are tufted or sewn into a primary backing material which can be made of a number of different materials including, but not limited to, polypropylene and polyester. A primary coating material, or precoat, is applied to the fiber and primary backing to hold the face fibers in place. The primary coating of most synthetic turfs includes polyurethane and also typically includes a filler such as calcium carbonate or coal fly ash. Primary coatings may also include latex, hot melt adhesives, and/or thermoplastics in addition to or instead of polyurethane. Synthetic turfs may also have a secondary coating which may be similar to the primary coating described herein. Synthetic turfs may also have a secondary backing which can be made of a number of different materials including, but not limited to, polypropylene and polyester.

The face fibers typically make up from about 19 wt % to about 80 wt % of a synthetic turf. The primary backing typically makes up from about 1 wt % to about 25 wt % of a synthetic turf. The primary coating typically makes up from about 15 wt % to about 80 wt % of a synthetic turf.

Synthetic turf may also include an infill material dispersed among the upstanding ribbons, which acts as a ballast and/or contributes to the physical properties of the turf, such as resiliency, that make the turf suitable for a particular use. Synthetic turf infill may be made of any material suitable for providing desired physical properties for the synthetic turf, but most often includes materials such as sand, gravel, cork, polymer beads, and rubbers, including but not limited to crumb rubber, ethylene propylene diene monomer (EPDM) rubber, and neoprene rubber.

The face fibers may include polyethylene, polypropylene, nylon, or other materials singly or in combination. The face fibers may include from about 0 wt % to about 1100 wt % polyethylene, from about 0 wt % to about 100 wt % polypropylene, and from about 0 wt % to about 100 wt % nylon. In some embodiments, the face fibers include blends of polypropylene (PP) and polyethylene (PE) in any of the following ratios of PP:PE-5:95; 10:90; 50:50; 90:10; 95:5 or any ratio that is within these ranges of ratios. In some embodiments, the face fibers include blends of PP and nylon in any of the following ratios of PP:nylon-5:95; 10:90; 50:50; 90:10; 95:5 or any ratio that is within these ranges of ratios. In some embodiments, the face fibers include blends of PE and nylon in any of the following ratios of PE:nylon-5:95; 10:90; 50:50; 90:10; 95:5 or any ratio that is within these ranges of ratios. In some embodiments, the face fibers include blends of PP, PE, and nylon in any of the following ratios of PP:PE:nylon-10:10:80; 10:80:10; 80:10:10; 33:33:33 or any ratio that is within these ranges of ratios.

The primary backing may include polyester, polypropylene, and other materials singly or in combination. The primary backing may include from about 0 wt % to about 100 wt % polyester or from about 0 wt % to about 100 wt % polypropylene. In some embodiments, the primary backing includes blends of PP and polyester in any of the following ratios of PP:polyester-5:95; 10:90; 50:50; 90:110; 95:5 or any ratio that is within these ranges of ratios.

The primary coating may include polyurethane, latex, hot melt adhesive, and/or thermoplastics alone or in combination. Suitable hot melt adhesives include, but are not limited to, Reynolds 54-041, Reynolds 54-854, DHM 4124 (The Reynolds Company P.O. Greenville, S.C., DHM Adhesives, Inc. Calhoun, Ga.). Suitable thermoplastics include, but are not limited to polypropylene, polyethylene and polyester. The primary coating may also include a filler that may be coal fly ash, calcium carbonate, iron oxide, or barium sulfate, or any other filler known in the art. The primary coating may include from about 0 wt % to about 100 wt % polyurethane, from about 0 wt % to about 100 wt % latex, from about 0 wt % to about 100 wt % hot melt adhesive, and/or from about 0 wt % to about 100 wt % thermoplastic. The primary coating may include from about 0 wt % to about 80 wt % filler. In some embodiments, the primary coating includes polyurethane, latex, or thermoplastic and from about 20 wt % to about 80 wt % filler, or from about 40 wt % to about 60 wt % filler. In other embodiments, the primary coating includes hot melts and from about 0 wt % to about 50 wt % filler, or from about 1 wt % to about 25 wt % filler, Several embodiments of primary coating and secondary backing compositions are shown below in Table 1.

TABLE 1

| Sample | Polyurethane wt % | Latex wt % | Hot Melt wt % | Polpropylene wt % | Polyester wt % |
|---|---|---|---|---|---|
| 1 | 10-70 | | 10-40 | 5-40 | |
| 2 | 30-97 | | | | 3-70 |
| 3 | 10-70 | | 10-40 | | 5-40 |
| 4 | 30-97 | | | 3-70 | |
| 5 | 10-70 | 10-40 | | 5-40 | |
| 6 | | 30-97 | | | 3-70 |
| 7 | | | 30-97 | | 3-70 |
| 8 | 10-70 | 10-40 | | | 5-40 |
| 9 | | 30-97 | | 3-70 | |
| 10 | | | 30-97 | 3-70 | |

Methods of Recycling Synthetic Turf

The methods described herein may be used to recycle and reuse synthetic turf, including turf described above, or other synthetic surfaces having chemical make-up similar to synthetic turf.

Recycling synthetic turf begins with the removal of the material from the point of installation. Typically for a sports field, the synthetic turf is installed by unrolling a 15 foot wide by 150 foot long strip of turf. A field typically requires multiple rolls, which are laid out on the field side by side and seamed together to form the field. Infill is then installed. The infill may be one or more of sand, rubber, and/or any other suitable material as described previously. When a synthetic turf is removed, typically some of the infill is separated from the remainder of the infill. The infill may be removed prior to the removal of the turf or at the same time. For example, a machine may collect the infill and place it into a container or onto the field. The turf and infill may be removed at the same time by a machine or by hand. The individual strips of turf may be re-rolled and shipped to a recycling facility. Alternatively, the strips of turf may be cut and optionally much of the infill is dumped out. The turf then may be downsized into sections (e.g., foot by 1 foot for ease and efficiency of shipping). The downsizing may be accomplished by hand or machine. The machine may be large or small and may use rotary blades or knives or any of a variety of different methods known in the art. The downsized pieces are typically placed on pallets and shipped to a recycling facility. Prior to recycling the pieces may be downsized even further to a size suitable for the recycling equipment being used. The turf pieces may be downsized using any method known in the art (e.g., cutting, chopping, shredding, pulling, and the like). A suitable size for the turf pieces for recycling depends on the extrusion equipment being used, and a person of skill in the art familiar with that equipment is familiar with the size of material that is appropriate. Turf pieces that are ready for recycling are referred to herein as turf fragments. The sizes of the turf fragments are highly variable. Likewise, the turf fragments may have any shape. The turf fragments may include very small particles, or fines, that are almost dust-like, but also may include small irregularly shaped particles having a longest dimension of up to about 0.25 to 0.5 inch, and in many cases also may include ribbons of material having widths of less than 0.25 inch, but lengths up to about 2 inches. In some embodiments the very small particles, or fines, make up about 5% or less of the turf fragments. The turf fragments typically are a loosely packed low density solid material.

Initial efforts to convey the low density turf fragments resulted in clogging and inconsistency in weight of material delivered to the extruder port. Conveyance of low density turf fragments was not effective with standard equipment. Specific problems with conveyance of the low density turf fragments included bridging and clumping of the materials, which in some cases caused the weight of material delivered to the extruder to vary and in the worst cases prevented conveyance of the material altogether.

Continuous feeding of particulate materials often results in bridging (also called arching) and rat-holing of the materials which can cause intermittent or inconsistent flow through the process. Bridging and rat holing may occur when a particulate material is being discharged from a vessel (e.g., a silo, bin, hopper, or the like). Bridging or arching occurs when the particles near the outlet of the vessel discharge, but particles more distant from the outlet mechanically lock or form bonds with each other, thereby creating an obstruction in the form of a bridge (or arch) over the outlet so that no more material may pass through the outlet. Rat-holing occurs when particles directly over the outlet of a vessel discharge creating a channel directly over the outlet, and particles outside the channel have sufficient cohesive strength that they do not enter the channel and do not discharge from the vessel. Bridging and rat-holing are typically associated with fine particulate materials such as powders.

Clumping can occur when particles of a low density material accumulate to such an extent that the weight of the accumulated particles densities the material at the bottom of the mass, causing the particles to pack together and preventing the particles from flowing. Clumping can contribute to bridging.

Problems with conveyance of the turf fragments were overcome by use of mechanical material flow aids. A variety of material flow aids are commercially available from companies such as, but not limited to, Chicago Vibrator Products (Westmont, Thayer Scale (Pembroke, Mass.), FMC Technologies, Inc. (Tupelo, Miss.), K-Tron (Pittman, N.J.), Horizon Systems, Inc. (Lawrence, Kans.), Mine & Process Service, Inc. (Kewanee, Ill.), and Jenike & Johanson, Inc, (Tyngsboro, Mass.). These flow aids typically make use of vibrators, baffles, screens, directed air flow or combinations thereof to convey consistent weights of particulate materials through a process. We developed and used a mechanical system to maintain good conveyance of the turf fragments through the process. In some embodiments, bins or hoppers included rollers having external spikes or baffles that rotated among the turf fragments to constantly or intermittently blend the fragments and thereby prevent clumping and bridging. Using such equipment allowed conveyance of the low density turf fragments through the process. Adjusting process parameters such as flow rate also aided in moving material in a more consistent manner.

Extruding the synthetic turf material initially posed problems including off-gassing that was due to the dissimilar materials such as nylons, filers, and thermoplastics, all having different melt characteristics. The significant amount of gas in the extrudate caused the extrudate to decrease in density upon exiting the extruder. This lower density material clogged the orifices, and broke when extruded as strands. Underwater pelletizing lessened the problems, but was limiting in particulate size and shape. The problems with off-gassing were overcome by modifying or adding one or more processing steps. In some embodiments, the orifices at the exit of the extruder that were clogging were replaced with a slot to alleviate clogging. In some embodiments, the blown or gas-entrapped film created by the off-gassing was passed through chilled rollers to press and re-densify the extrudate. In some embodiments, the re-densified extrudate was then passed through a chilled water bath. Use of one or more of such processing steps provided an extrudate having the desired properties that optionally could be cut into strands and/or pellets.

Additives

One method of recycling synthetic turf includes combining synthetic turf fragments with at least one additive, which is a modifier, filler, or colorant to form a mixture; and extruding the mixture to form an extrudate. The extrudate optionally is then size reduced. In some embodiments, the step of combining the turf and the additive includes conveying the turf fragments and the additive to a blender, mixing the turf fragments and the additive in the blender, and removing the turf/additive mixture from the blender. In some embodiments the synthetic turf fragments and the additive are separately but concurrently conveyed into the blender. In some embodiments, the method is carried out as a continuous process.

In some instances, it is desirable to add one or more fillers, modifiers, colorants, or other additives to the turf fragments prior to extrusion. In some embodiments, these additives may aid in extrusion of the turf fragments and/or impart desired properties to the extruded product. Accordingly, in one embodiment of the present disclosure the disclosed method includes the step of combining the turf fragments with at least one filler, modifier, colorant or other additive. These additives may be added prior to or during the extrusion process. When the additives are added prior to extrusion, they are premixed with the turf fragments and added to the extruder. One of skill in the art can determine for a given process whether it is advantageous to add the additives prior to or during extrusion. One factor in this determination is the type of extruder used. For example, twin screw extruders efficiently mix the turf fragments and additives together during extrusion.

Fillers may include but are not limited to calcium carbonate, coal fly ash, iron oxide, barium sulfate, or other fillers known in the art Modifiers, colorants, or other additives that are suitable for use with the present invention include, but are not limited to, plasticizers, elastomers, compatibilizers, colorants, antimicrobials, and UV stabilizers. Examples of modifiers that can be used are the following: wax; EPDM rubber; high and low density polyethylene; high and low density polypropylene; Exxon Vistamaxx 6102, Exxon Vistamaxx 3000, Exxon PX 9361, and Exxon PX 9371 (all available from Exxon Mobile Chemical Polymer Group, Houston, Tex.); Faraprene 381-35A (available from O'Neil Color and Compounding, Jasper, Tenn.); SureFlo 3001E and SureFlo 3001N (available from Flow Polymers, Inc., Cleveland, Ohio); and any number of other modifiers. Suitable colorants include dyes and pigments. Red, green, blue, black or any number of different colors can be added. However, in some embodiments, colorants may have very little effect due to the dark nature of the material.

The additive may be any material that imparts the desired properties and in some embodiments may be pre- or post-consumer waste. Post-consumer waste includes a product (or part of a product) that has been used for its intended end-use purpose and has been discarded or otherwise removed from use. By contrast, pre-consumer waste includes manufacturing scrap or a defective product that has never been used by a consumer. As one example, carpet scrap, either pre- or post-consumer waste, if reduced to an appropriate size may be used as an additive. The carpet scrap should be reduced in size to a size similar to the size of the turf fragments. The components of the carpet scrap, which typically include nylon fibers, latex, polyurethane, polypropylene, can function as the fillers or modifiers described above. For example, the polypropylene can function as a modifier and the latex and polyurethane can function as filler. Using carpet scrap thus imparts desired properties to the recycled turf material and also provides a use for waste that would otherwise go to a landfill.

In some embodiments, synthetic turf fragments make up from about 10 wt % to about 90 wt % of the material that is extruded. In some embodiments, the amount of filler added prior to or during extrusion is from about 10 wt % to about 90 wt % of the material that is extruded. In some embodiments, the amount of filler added prior to or during extrusion is from about 10 wt % to about 70 wt % or from about 10 wt % to about 50 wt % of the material that is extruded. In some embodiments, the amount of modifier added prior to or during extrusion is from about 10 wt % to about 90 wt % of the material that is extruded. In some embodiments, the amount of modifier added prior to or during extrusion is from about 10 wt % to about 70 wt % or from about 10 wt % to about 50 wt % of the material that is extruded. In some embodiments, the amount of colorant added prior to or during extrusion is from about 1 wt % to about 10 wt % of the material that is extruded.

The step of extruding the mixture of synthetic turf fragments and additive may be carried out with any equipment suitable for extrusion or known to one of skill in the art. A number of different extruders may be used for this process depending upon the type of mixing or heating that is desired. Examples of suitable extruders include single screw and twin screw extruders. The twin screw extruder can have co-rotating or counter rotating screws and the single screw extruder has one rotating screw. The screws can be designed for different purposes but have the capacity to heat and mix the material. Extruders typically have variable screw speeds and variable heating as well as variable feed rates. The appropriate speed and heat rate is determined by the type of output desired.

Extrusion is carried out at elevated temperatures. In some embodiments the temperature during extrusion is between about 200° F. and about 500° F., or between about 250° F. and about 450° F. In some embodiments the temperature during extrusion is between about 350° F. and about 400° F. In some embodiments the rate of extrusion is from about 3 to about 2,000 lbs/hour, or from about 100 to about 500 lbs/hour, or from about 300 to about 500 lbs/hour.

Extrusion can be carried out using any size die that will provide a product of the desired size and shape, but in some embodiments is carried out using a die that has an aperture in the shape of a slot. The size of the slot may vary depending on the size of the extruder, the size of the available cutting equipment, and/or the desired use of the extrudate. One of skill in the art can easily determine the appropriate size of the slot based on the available equipment and desired end use of the product.

In some embodiments upon exiting the die the extrudate is passed through chilled rollers. In some embodiments the rollers are chrome plated, jacketed, and chilled by running chilled fluid or fluid mixture (e.g., water) through the rollers. These chilled rollers typically are at a temperature between 55° F. and 85° F. In some embodiments the chilled rollers are at a temperature between 65° F. and 75° F. When the extrudate passes through the chilled rollers it becomes more dense. Different combinations of starting materials for the extrusion process produce extrudates having different densities coming out the extruder and result in different changes in density as the extrudate passes through the chilled rollers. By way of example only, however, in some embodiments, upon passing through the chilled rollers, the density of the extrudate changes from between about 35 and 50 lbs/ft$^3$ to between about 60 and 80 lbs/ft$^3$. In some embodiments, upon passing through the chilled rollers, the density of the extrudate changes from between about 40 and 45 lbs/ft$^3$ to between about 70 and 75 lbs/ft$^3$. In some embodiments, the extrudate is passed through a chilled fluid bath (e.g., water or water mixture). The fluid bath is at a temperature between 55° F. and 80° F. In some embodiments the temperature of the bath is between 65° F. and 75° F. The extrudate typically remains in the bath between 10 and 30 seconds. In one embodiment, the extrudate remains in the bath about 15 seconds. One of skill in the art can easily determine the optimal temperature for an extrudate having a desired end use.

In some embodiments, the extrudate is cut into pellets or granules. In some embodiments the extrudate is cut by a pelletizer that slices the extrudate into strips, then dices the strips into pellets. One such pelletizer is produced by Henion Dicing Products, LLC (Kennesaw, Ga.). One potential use of the pellets is as infill for other synthetic turf installations, but other uses are contemplated as well, such as playground material, fill for the sub-base of an athletic track, raw material for injection molding or extrusion, as a component of a backing or baseboard, or as a packing material. To produce pellets of a desired size and/or shape the extrudate may be cut once or more than once. For example, the extrudate may be cut into strips and then those strips may be cut into pellets. In some embodiments, the final product of the extrusion step includes pellets of any desired shape including, but not limited to, spherical, cylindrical, cubical, rhomboidal, or oval/football shaped. The pellets may also be of an irregular shape. This irregular shape might be advantageous, for example, to aid tight packing of the granules.

The size and quantity of the pellets produced depends upon the speed of the extruder and the cutting system. The size of the pellets may vary substantially depending on the intended use and the methods of the current invention are suitable for producing pellets in a wide variety of sizes. For example, in some embodiments, the pellets may be a cube about 1 inch (in.) (2.54 cm) per side or may be of another shape with their longest dimension about 1 in. (2.54 cm). As one example, such pellets may be useful in injection molding. In some embodiments, the pellets may be smaller, with their longest dimension less than about 0.4 in. (1 cm). As one example, such pellets may be useful as infill for synthetic turf. In some embodiments, pellets intended for use as synthetic turf have sizes that vary from 0.05 mm to 9 mm across their longest cross-section. In some embodiments, the sizes of those pellets vary from 1 mm to 6 mm or from 1 mm to 3 mm across their longest cross-section. In some embodiments, the pellets are between around 25 pellets per gram and 400 pellets per gram. In one embodiment the pellets are around 200 pellets per gram and each have an oblong shape (e.g., a football shape).

As an example of the extrusion process, in one non-limiting embodiment, synthetic turf fragments are mixed with post-consumer polyethylene, which functions as a modifier; polyurethane, which functions as a filler; and Exxon Vistamaxx 6102, which functions as a compatibilizer/modifier. The mixture includes about 60 wt % turf fragments, about 20 wt % polyethylene, about 10% polyurethane, and about 10% Vistamaxx. The mixture is poured into the feed system of an extruder. The mixture is heated to approximately 500° F. and mixed at approximately 68 RPM. The duration of mixing relates to the size of the extruder and the speed of operation. The mixture is then pushed out of the extruder by the screws through a plate on the end of the extruder. The plate has a slot with dimensions approximately 3.5 inches wide and approximately 0.25 inches high, through which the material is extruded. A ribbon of extruded material is produced. The ribbon is then pressed and densified by chilled rollers and cooled in a water bath. The densified ribbon is drawn into a cutter where it is cut into strips that are then cut into pellets. The pellets are approximately 3 mm to about 6 mm across their largest cross-section.

In one embodiment, the disclosed method further includes the step of separating at least 90% (wt) of non-recyclable components from the synthetic turf before the step of mixing the synthetic turf fragments with the additive. Many conventional synthetic turfs include large quantities of infill materials such as sand, gravel, and rubber. These materials, however, are not generally considered recyclable and are not favored for use in the recycling method described herein. Accordingly, in some instances, it may be desirable to remove at least some of the infill, or other components, of an existing synthetic turf before subjecting that synthetic turf to the recycling method described above. Separating the non-recyclable infill or other non-recyclable components may be accomplished before or after the synthetic turf is size reduced to turf fragments. In some embodiments, a portion of non-recyclable infill material is separated from the remaining synthetic turf. In some embodiments, at least 80% (wt) of the non-recyclable infill material is separated from the remaining synthetic turf. In some embodiments, at least 90% (wt) of the non-recyclable material is separated from the remaining synthetic turf. In some embodiments, at least 95% (wt) of the non-recyclable infill material is separated from the remaining synthetic turf. In some embodiments, at least 98% (wt) of the non-recyclable material is separated from the remaining synthetic turf.

One of skill in the art would recognize that the methods disclosed herein are not limited to use with synthetic turf, but are suitable for recycling other products made of similar materials.

Embodiments of this invention also provide for a synthetic turf. In some embodiments, the includes a material (for example particles or pellets) made from recycled synthetic turf. The terms particle and pellet are used interchangeably herein. In some embodiments, the is made by a process described herein.

In one embodiment the is a pellet or particle that is a mixture of (a) polyethylene, polypropylene, or nylon or a combination thereof; (b) polyester or polypropylene or a combination thereof; or (c) polyurethane, latex, hot melt, a thermoplastic, polypropylene or polyethylene or a combination thereof; or, a combination of (a), (b), and (c). The pellets may include any component used in a synthetic turf, including but not limited to components used as the face fibers, the primary backing, the primary coating, and the as described previously herein. In some embodiments, sand, gravel, and rubber are present only as impurities and make up less than about 5 wt % of the infill pellets. In some embodiments, sand, gravel, and rubber make up less than 2 wt % of the pellets. In some embodiments, sand, gravel, and rubber are not present in the pellets.

In some embodiments the infill pellets of the present invention include: from about 19 wt % to about 80 wt % PE, PP, or nylon, or a combination thereof; from about 1 wt % to about 25 wt % PP or polyester, or a combination thereof; and from about 15 wt % to about 80 wt % polyurethane, latex, hot melt, or thermoplastic, or a combination thereof.

In some embodiments, infill pellets of the present invention include from about 10 wt % to about 90 wt % of recycled synthetic turf material. The percentage of recycled material in the final product may vary depending on the intended use for the pellets. For example, if more filler or modifier is required for a given use, the percentage of filler would be higher and the percentage of recycled material in the pellets would necessarily be lower. In some embodiments the infill functions as a ballast material. This infill may need more filler to increase the specific gravity of the pellets. In other embodiments, a material to be used as an infill for a playing surface may require less filler, but may also require additives for softness. The increased percentage of additives will influence the percentage of recycled material in the infill.

The pellets may be any desired shape. For example, in some embodiments the pellets can be substantially spherical, cylindrical, cubical, rhomboidal, oval/football shaped, or may be an irregular shape. Different shapes may be advantageous for different uses. For example, irregularly shaped pellets may pack more efficiently than regularly shaped pellets. The extent of packing of the pellets can affect the physical properties of a synthetic turf that includes the pellets. The pellets may be any desired size and one of skill in the art can easily determine an appropriate size for the desired end use of the pellets.

The physical properties of the pellets described herein can be adjusted by one skilled in the art at least by varying the size of the pellets, the shape of the pellets, and/or the composition of the pellets. For example, one of skill in the art would understand that the properties of the pellet may be adjusted by adjusting the amount of filler, additive, and/or modifiers. Thus, the pellets described herein can be made to have any desired physical property and are, thus, suitable for use in any synthetic turf.

Another embodiment of the invention is a synthetic turf that includes any of the pellets described above. This synthetic turf is suitable for a variety of uses, including but not limited to, athletic fields, landscaping, dog runs, putting greens, jogging paths, paintball fields, tennis courts, and playgrounds. Desired properties for a synthetic turf vary depending on the intended use of the turf. For example, depending on the intended use of the turf, one might prefer a softer surface (e.g., for playgrounds), a harder surface (e.g., for putting greens), or a surface that allows ideal ball bounce and/or ball roll (e.g., for athletic fields). Pellets described herein can be used to impart a variety of advantageous properties to synthetic turfs.

In some embodiments, a synthetic turf including infill pellets as described herein may also include another type of infill. This other type of infill may be any other infill used in synthetic turf including but not limited to sand, gravel, cork, polymer beads and rubbers. In some embodiments, multiple types of infill may be mixed together in a single layer in the synthetic turf. In other embodiments multiple types of infill may be disposed in a synthetic turf individually as discrete layers. Still other embodiments may include some combination of mixing and layering different types of infill.

FIG. 1 is a flow chart showing a process for recycling synthetic turf. The synthetic turf fragments ready for recycling are optionally removed of infill and then mixed with at least one additive, the additive being a modifier, filler, or a colorant. The turf fragment and additive mixture is then extruded into an extrudate, the extrudate then being cut into pellets.

Figure 2:
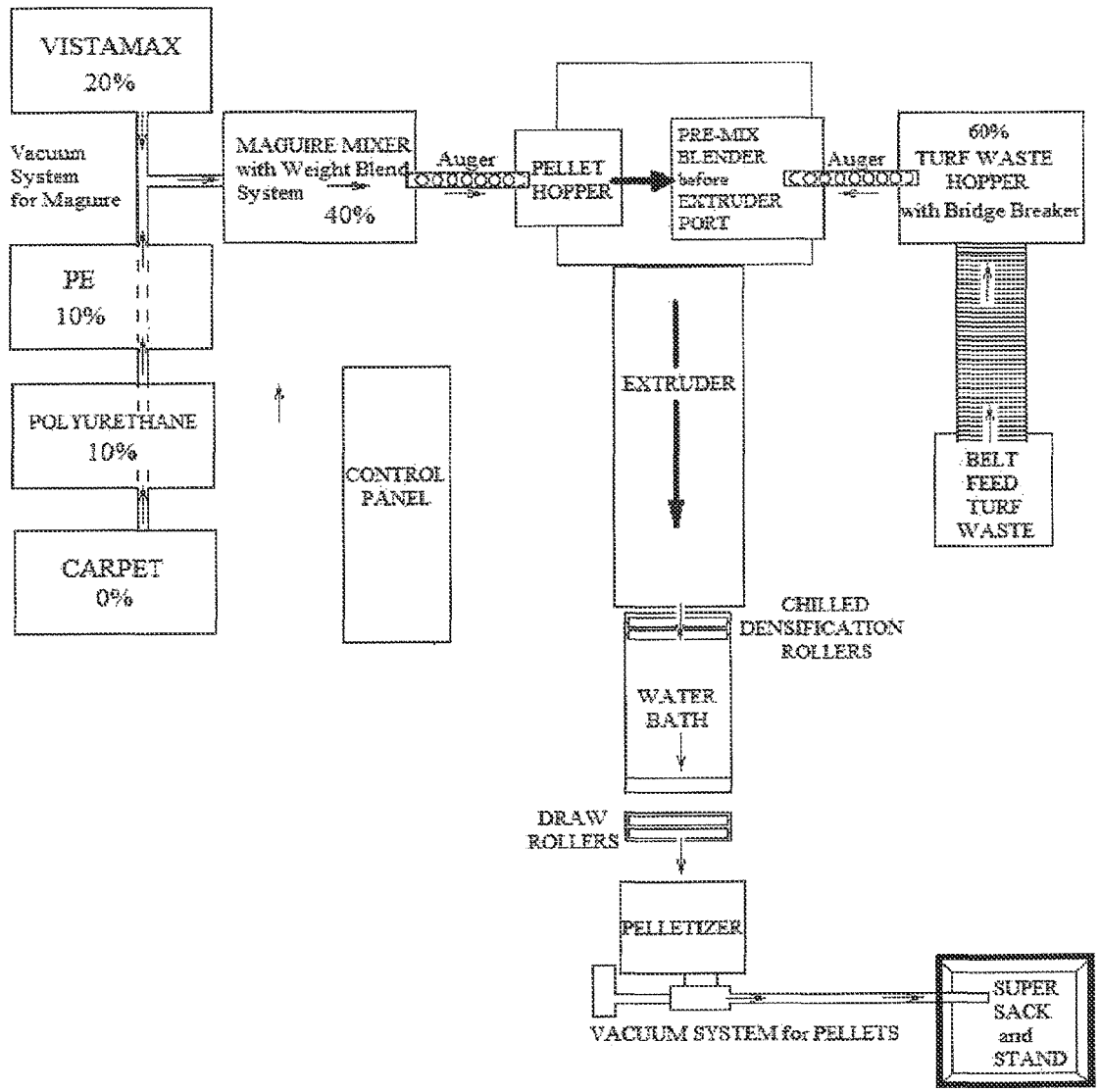
FIG. 2 is a flow chart of a specific embodiment of the process for recycling synthetic turf.

FIG. 2 is a flow chart showing a specific non-limiting embodiment of the process for recycling synthetic turf of the present invention. A mixture including approximately 60% turf waste to be recycled, approximately 20% Exxon Vistamaxx, approximately 10% polyethylene, and approximately 10% polyurethane is mixed before entering an extruder. The resulting extrudate is rolled with chilled rollers, passed through a chilled water bath, and then pelletized.

The following examples will serve to further illustrate the present invention without, at the same time, however, constituting any limitation thereof. On the contrary, it is to be clearly understood that resort may be had to various embodiments, modifications and equivalents thereof which, after reading the description herein, may suggest themselves to those skilled in the art without departing from the spirit of the invention.

Example 1

Synthetic turf fragments, 60%; Exxon Vistamaxx, 10%; polyurethane, 10%; and polyethylene, 20% were mixed together. The mixture was processed through a twin screw extruder having the temperature profile below:

TABLE 2

| Zone | Temp (° F.) |
|---|---|
| 1 | 500 |
| 2 | 500 |
| 3 | 500 |
| 4 | 500 |
| 5 | 500 |
| 6 | 450 | where zone 1 includes the entry port and zone 6 includes the exit, and the zones are of equal length and distributed along the length of the extruder from the entry to the exit. The material was extruded through a die having an aperture in the shape of a slot. The extrudate was passed through chilled rollers at a temperature between about 75° F. to 85° F., then through a chilled water bath at a temperature between about 65-75° F. The extruded material was at a temperature of about 475° F. coming out of the slot and about 75° F. coming out of the water bath. The extrudate produced had a breaking strength of 165.7 lbs/inch and an elongation of 20.8% measured according to ASTM 2256.

Example 2

Synthetic turf fragments, 60%; Exxon Vistamaxx, 20%; polyurethane, 10%; and polyethylene, 10% were mixed together. The mixture was processed through a twin screw extruder having the temperature profile in Example 1. After extrusion, the extrudate was processed as explained in Example 1. The extrudate produced had a breaking strength of 148.7 lbs/inch and an elongation of 118.3% measured according to ASTM 2256.

Example 3

Synthetic turf fragments, 60%; Exxon Vistamaxx, 15%; polyurethane, 7.5%; polyethylene, 7.5%; and carpet scrap, 10% were mixed together. The mixture was processed through a twin screw extruder having the temperature profile in Example 1. After extrusion, the extrudate was processed as explained in Example 1. The extrudate produced had a breaking strength of 217 lbs/inch and an elongation of 16.3% measured according to ASTM 2256.

Example 4

Synthetic turf fragments, 60%; Exxon Vistamaxx, 16%; polyurethane, 10%; and polyethylene, 14% were mixed together. The mixture was processed through a twin screw extruder having the temperature profile in Example 1. After extrusion, the extrudate was processed as explained in Example 1. The extrudate produced had a breaking strength of 147.6 lbs/inch and an elongation of 31.1% measured according to ASTM 2256.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A method for recycling synthetic turf comprising the steps of:
   a) combining a plurality of synthetic turf fragments with at least one modifier, filler, or colorant to form a mixture wherein the turf fragments include infill contained therein; b) removing from at least 80% to 98% of the infill from the synthetic turf fragments before combining them with the modifier, filler, or colorant; c) extruding the mixture to form an extrudate; and d) cutting the extrudate into pieces.

2. The method of claim 1, wherein the modifier is selected from the group consisting of polypropylene, polyethylene, rubber, Exxon Vistamaxx 3000, Exxon PX9361, Exxon PX 9371, Faraprene381-55A, and combinations thereof.

3. The method of claim 1, wherein the step of combining the synthetic turf fragments with at least one modifier, filler, or colorant occurs in the extruder.

4. The method of claim 1, wherein the step of combining the synthetic turf fragments with at least one modifier, filler, or colorant comprises conveying the synthetic turf fragments to a blender, conveying the at least one modifier, filler, or colorant to the blender, and mixing the fragments and the at least one modifier, filler, or colorant in the blender.

5. The method of claim 4, wherein the steps of conveying the synthetic turf fragments to the blender and conveying the at least one modifier, filler, or colorant to the blender occur concurrently.

6. The method of claim 4, wherein the steps of conveying the synthetic turf fragments; conveying the modifier, filler, or colorant; and mixing are continuous.

7. The method of claim 1, further comprising passing the extrudate through chilled rollers prior to cutting the extrudate into pieces.

8. The method of claim 7, wherein the step of passing the extrudate through chilled rollers comprises pressing and densifying the extrudate.

9. The method of claim 1, further comprising passing the extrudate through a chilled water bath prior to cutting the extrudate into pieces.

10. The method of claim 1, wherein the step of extruding the mixture comprises forcing the mixture through a slot.

11. The method of claim 1, wherein the step of extruding the mixture is continuous.

12. The method of claim 1, wherein the step of cutting the extrudate into pieces comprises cutting the extrudate into strands and cutting the strands into pellets.

13. The method of claim 1, wherein the synthetic turf comprises:
   face fibers;
   a primary backing; and
   a primary coating.

14. The method of claim 13, wherein the face fibers comprise polyethylene, polypropylene, nylon, or a combination thereof.

15. The method of claim 13, wherein the primary backing comprises polyester or polypropylene or a combination thereof.

16. The method of claim 13, wherein the primary coating comprises polyurethane, latex, hot melt, or a thermoplastic or a combination thereof.

17. The method of claim 14, wherein the polyethylene, polypropylene or nylon or the combination thereof comprise about 19 wt % to about 80 wt % of the synthetic turf fragments.

18. The method of claim 15, wherein the polyester or polypropylene or the combination thereof comprise about 1 wt % to about 25 wt % of the synthetic turf fragments.

19. The method of claim 16, wherein the polyurethane, latex, hot melt, or the thermoplastic, or the combination thereof comprise about 15 wt % to about 80 wt % of the synthetic turf fragments.

20. A method for recycling synthetic turf comprising the sequential steps of:
   a) combining a plurality of synthetic turf fragments with at least one filler to form a mixture wherein the turf fragments include infill contained therein;
   b) removing from at least 80% to 98% of the infill from the synthetic turf fragments;
   c) extruding the mixture to form an extrudate; and
   d) cutting the extrudate into pieces.

21. The method of claim 20, wherein the filler is selected from the group consisting of calcium carbonate, barium sulfate, coal fly ash, iron oxide, and combinations thereof.

* * * * *